(No Model.)
A. R. LEWIS.
EAVES TROUGH HANGER.
No. 514,758.  Patented Feb. 13, 1894.
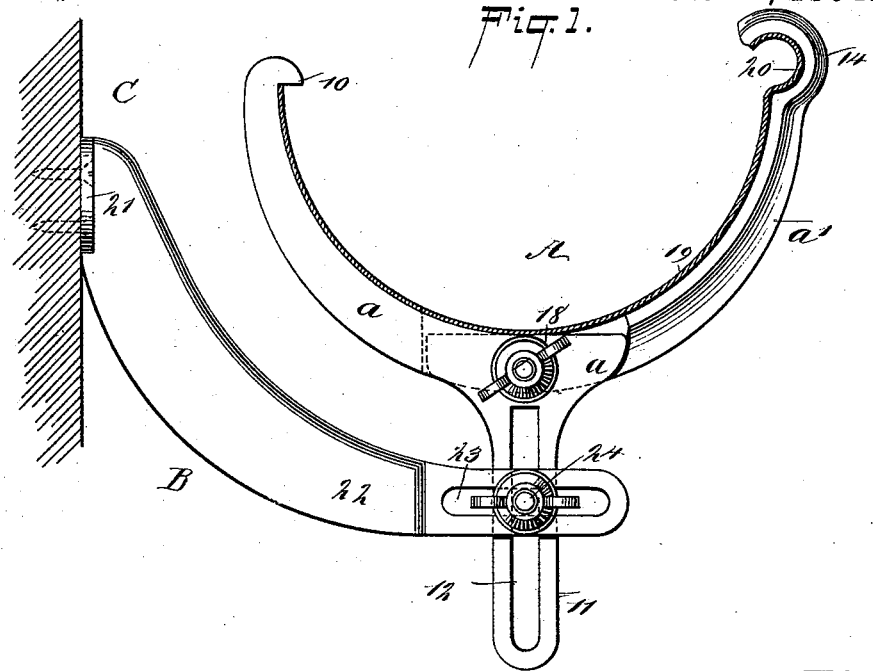
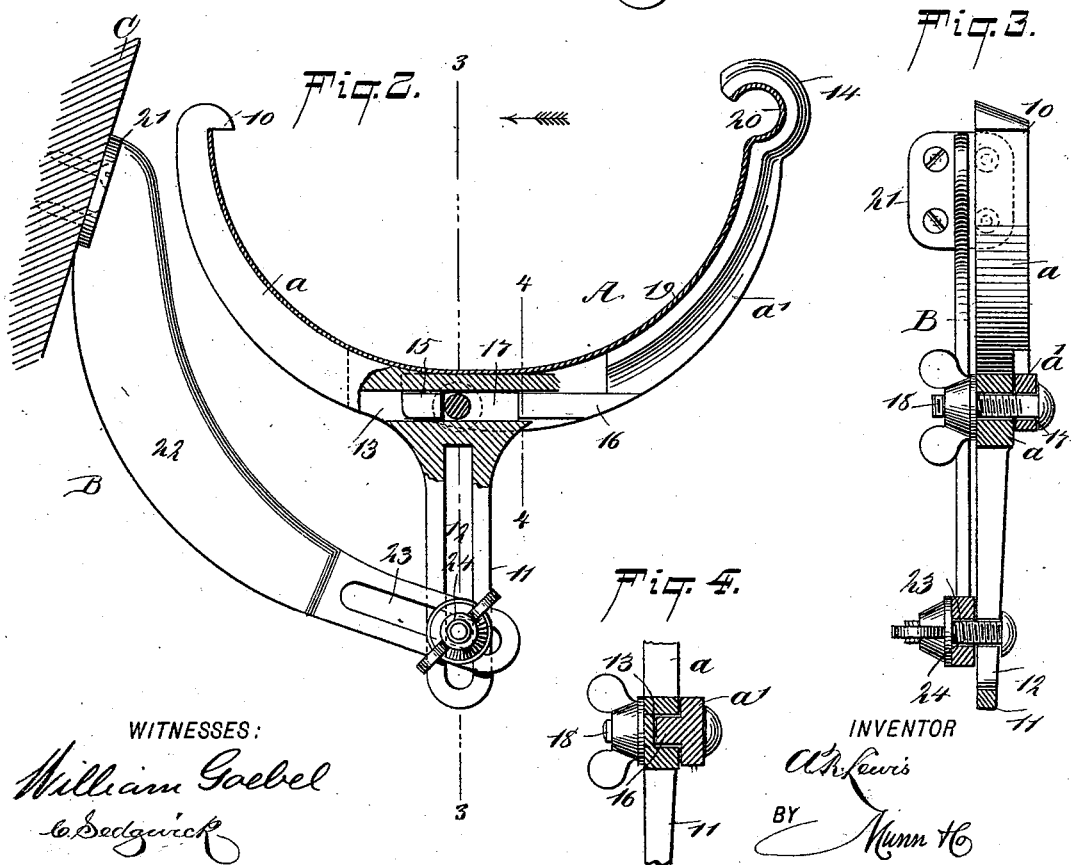
WITNESSES:
William Goebel
C. Sedgwick
INVENTOR
A. R. Lewis
BY
Munn & Co.
ATTORNEYS.

UNITED STATES PATENT OFFICE.

ALLEN R. LEWIS, OF SHELTON, WASHINGTON.

EAVES-TROUGH HANGER.

SPECIFICATION forming part of Letters Patent No. 514,758, dated February 13, 1894.

Application filed July 28, 1893. Serial No. 481,741. (No model.)

*To all whom it may concern:*

Be it known that I, ALLEN R. LEWIS, of Shelton, in the county of Mason and State of Washington, have invented a new and Improved Eaves-Trough Hanger, of which the following is a full, clear, and exact description.

My invention relates to an improvement in eaves trough hangers, and it has for its object to provide a hanger of exceedingly simple and durable construction, capable of being conveniently and expeditiously attached to any structure, and which may be adjusted with dispatch to accommodate the eaves troughs of any angle or pitch, the hanger being capable of both a horizontal and a vertical adjustment, and likewise an adjustment capable of permitting it to receive eaves troughs of different widths.

The invention consists in the novel construction and combination of the several parts, as will be hereinafter fully set forth and pointed out in the claims.

Reference is to be had to the accompanying drawings forming a part of this specification, in which similar figures and letters of reference indicate corresponding parts in all the views.

Figure 1 is a side elevation of the improved eaves trough, illustrating it as attached to a straight eave. Fig. 2 illustrates the eaves trough as attached to an inclined eave, and is a partial side elevation and partial vertical section of the hanger. Fig. 3 is a section taken vertically and practically on the line 3—3 of Fig. 2; and Fig. 4 is a section taken in like manner essentially on the line 4—4 of Fig. 2.

The eaves trough hanger comprises virtually three parts, namely a body A, constructed in two sections $a$ and $a'$ and a bracket B, the latter being adapted for attachment to any fixed support. Both members $a$ and $a'$ are somewhat segmental in shape, and when the two parts are placed in proper relation to one another they will combinedly form practically a semi-circle, their concaved faces being uppermost. The member $a$ is provided at its upper end with a lug 10, extending inwardly or in direction of the opposite member, and the said member is likewise provided at its lower end with a downwardly extending shank 11, provided with a longitudinal slot 12, and above the shank the member $a$ in one face is provided with a horizontal groove or channel 13, as is best shown in Fig. 2. The opposing member $a'$ of the body of the hanger terminates at its upper end in an inwardly inclined hook extension 14, and at the opposite end of the member $a'$, two horizontal lugs 15 and 16, are located, said lugs being adapted to slide in the channel or groove 13 of the member $a$. The member $a'$, is likewise provided with a slot 17 between its lugs 15 and 16, adapted to receive a clamp screw 18, which clamp screw is likewise passed into or through the base or inner end of the opposing member $a$ of the body. In this manner it will be observed that the two members, by loosening the clamp screw, may be adjusted to receive between them the eaves trough 19, and then may be closed together in a manner to clamp the trough firmly between them, at which time the clamp screw 18 is again tightened, and the trough cannot slip since it engages with the projection 10 of the member $a$ of the body, and a bead 20, is formed upon the trough adapted to enter the hook extension 14 of the member $a'$.

The bracket B consists of a base plate 21, adapted to be screwed or otherwise secured to the eave C of a building or other support, and an arm 22, which is curved downward from the base plate, said arm being provided at its lower end with a slot 23, and the bracket and body of the eaves trough are connected by means of a clamp screw 24, or the equivalent thereof, which is passed through the slot of the bracket and the slot in the shank of the member $a$ of the body of the hanger; and it may here be remarked that the shank 11 of the body of the hanger is located below the central portion thereof.

It is evident that any adjustment, either vertically or horizontally, or any adjustment between these two points, may be made at the junction of the shank of the body with the bracket, that may be required to properly set the hanger with relation to the building.

Having thus described my invention, I claim as new and desire to secure by Letters Patent—

1. An eaves-trough hanger, composed of two curved sections $a$, $a'$, which are adjustable toward and from each other in the same plane, one having a horizontal groove, 13, and the other a corresponding projection adapted to slide therein, one of said sections being also provided with a slot which is parallel to the said groove and projection, and a clamp-screw which passes through the sections and serves to fasten them in any horizontal adjustment, as shown and described.

2. In an eaves trough hanger, the combination, with a trough support, comprising two sections having guided movement one upon the other, each section being provided with a stop adapted for engagement with an eaves trough, one of the sections being provided with a slotted shank, and clamping screw adjustably connecting the members of the eaves trough support, of a bracket adapted to be secured to a fixed support, one portion of the bracket being slotted, and clamping screw passed through the slotted portion of the bracket and the shank of the eaves trough support, as and for the purpose specified.

ALLEN R. LEWIS.

Witnesses:
GRANT C. ANGLE,
F. B. FROST.